United States Patent [19]

Ito et al.

[11] Patent Number: 4,819,082
[45] Date of Patent: Apr. 4, 1989

[54] MANUSCRIPT READING DEVICE

[75] Inventors: Hisao Ito; Mamoru Nobue; Yoshio Nishihara; Teiichi Suzuki, all of Ebina, Japan

[73] Assignee: Fuji Xerox Co., Ltd., Japan

[21] Appl. No.: 67,455

[22] Filed: Jun. 26, 1987

[30] Foreign Application Priority Data

Jun. 30, 1986 [JP] Japan ................................ 61-153051

[51] Int. Cl.$^4$ ............................................ H04N 1/028
[52] U.S. Cl. ..................................... 358/294; 358/293
[58] Field of Search ................................ 358/293, 294

[56] References Cited

U.S. PATENT DOCUMENTS

| 4,449,147 | 5/1984 | Ogasawara | 358/293 |
| 4,566,040 | 1/1986 | Ozawa | 358/293 |
| 4,575,638 | 3/1986 | Okumura | 358/293 |
| 4,620,236 | 10/1986 | Tanaka | 358/293 |
| 4,644,411 | 2/1987 | Sato | 358/293 |
| 4,675,534 | 6/1987 | Sekimura | 358/293 |

Primary Examiner—Howard W. Britton
Attorney, Agent, or Firm—Welsh & Katz, Ltd.

[57] ABSTRACT

A manuscript reading device for reading a manuscript comprises a plurality of photodiodes for storing electric charges in parasitic capacitances thereof corresponding to lightness-and-darkness information on each minute area of a picture image on the manuscript by way of biasing said photodiodes to a predetermined state, and a plurality of thin film transistors connected in series to associated one of the photodiodes for transferring the electric charges stored in said parasitic capacitances to a corresponding wiring capacitance of a rear wiring group in response to the application of a predetermined voltage to gate electrodes thereof, the electric charges transferred and stored in said wiring capacitance being sequentially outputted as picture information corresponding to said picture image on the manuscript, wherein the thin film transistor comprises an n-type thin film transistor to a gate electrode of which a positive voltage is applied, and the photodiode is biased by a positive voltage.

4 Claims, 5 Drawing Sheets

FIG_1

MANUSCRIPT READING DEVICE

BACKGROUND OF THE INVENTION

This invention relates to a manuscript reading device for use in a picture image inputting portion of a facsimile apparatus, etc., and more particularly to a manuscript reading device of contact type wherein a picture image drawn on a manuscript is read with the manuscript being in contact with the device.

A manuscript reading device of the contact type typically comprises a photodiode array including multiplicity of photodiodes arranged in row, each being biased by a predetermined voltage and storing in parasitic capacitance thereof a signal electric charge which corresponds to lightness-and-darkness information on each minute area of the picture image, and a switching transistor array including a plurality of switching transistors, each connected in series to the corresponding photodiode of the photodiode array, for sequentially outputting the signal electric charge stored in each parasitic capacitance by the switching operation thereof as picture image information.

As is well known, in the contact type manuscript reading apparatus, the length of the photodiode array is set to be the same as the width of the manuscript, wherein the picture image on the manuscript is read in one-to-one image formation manner using such an optical system as an optical fiber array or a lens array, etc. It is also known that by shortening the length of a light transmission passage necessary for forming a picture image, inputting portion of the facsimile apparatus is made considerably compact.

In a conventional manuscript reading device, by using a MOSFET array as a switching transistor array, a higher reading speed can be obtained. However, when mounting ICs consisting of the MOSFET to the substrate in which the photodiode array is provided, the ICs should be connected with the switching transistor array by a wire bonding method or the like. Consequently, the reliability of the device is reduced and a production cost is made high.

To obviate the foregoing problems, the following configuration and driving method has been studied recently;

(a) thin film transistors as a substitute for the MOSFETs, are connected to each photodiode in the photodiode array, the thin film transistor being formed by the same thin film forming process as used in manufacturing the photodiode array;

(b) pairs of photodiode and a thin film transistor, whose one terminal (e.g., drain electrode) is connected to the photodiode, are divided into a plurality of blocks, and the other terminal (e.g., source electrode) of the thin film transistors is connected in a so-called matrix wiring manner in which each block is commonly connected to one wiring group;

(c) the plurality of blocks of the thin film transistors are sequentially driven at a predetermined interval with each block being concurrently driven, whereby signal electric charge of each block temporarily stored in the capacitance of the matrix wiring is sequentially outputted by means of switching transistors constructed by MOSFET.

With this configuration, the number of ICs mounted to the substrate by wire bonding method, etc. can be greatly decreased, and therefore the apparatus can be manufactured quite readily. Furthermore, since the process of wire bonding is reduced, the manufacturing cost is reduced and the reliability of the apparatus is enhanced.

However, the reading speed of the apparatus is lowered because a switching speed of the thin film transistor serving as a transferring transistor is lower than that of the MOSFET.

It is an object of this invention to improve the reading speed and more particularly to a transfer speed of electric charges of the contact type manuscript reading device in which thin film transistors are used as a transistor array for transferring electric charges.

SUMMARY OF THE INVENTION

According to this invention, a manuscript reading device for reading a manuscript, having a plurality of photodiodes for storing electric charges in parasitic capacitances thereof corresponding to lightness-and-darkness information on each minute area of a picture image on the manuscript by way of biasing said photodiodes to a predetermined state, and a plurality of thin film transistors connected in series to associated one of the photodiodes for transferring said electric charges stored in the parasitic capacitances to a corresponding wiring capacitance of a rear wiring group in response to the application of a predetermined voltage to gate electrodes thereof, the electric charges transferred and stored in said wiring capacitance being sequentially outputted as picture information corresponding to the picture image on the manuscript, improvements that the thin film transistor comprises an n-type thin film transistor to a gate electrode of which a positive voltage is applied, and that the photodiode is biased by a positive voltage.

In this configuration, wiring capacitance of the wiring group is larger than the parasitic capacitance of the photodiode by one digit or more. Accordingly, by connecting the source electrode of the thin film transistor with the wiring capacitance, the voltage variation on the source electrode side is small when electric charges are transferred so that an effective voltage between the gate and source electrodes varies little. For this reason, electric charges stored in the parasitic capacitance of the photodiodes are transferred to the wiring capacitance effectively and rapidly.

In contrast, in the conventional picture image reading device, the photodiode array has been biased, in general, by a negative voltage for the necessity of its structure, and therefore the source electrode of the thin film transistor is connected to the side where the photodiode having a small capacitance is provided. Because of this configuration, the voltage caused by electric charge transfer varies largely, thereby lowering the voltage between the gate and the source electrodes. This has been the cause of the low efficiency in electric charge transfer.

As described above, in the manuscript reading device according to this invention, the electric charge transfer speed of the thin film transistor serving as an electric charge transferring transistor is greatly enhanced, thereby improving the reading speed of the overall manuscript reading device. This also means that the thin film transistor having the above-described configuration can be positively used for an electric charge transfer and that a high stable apparatus is readily manufactured. Furthermore, according to this invention, an advantageous effect can be produced since the photodiode array is biased by a positive voltage and therefore the polarity of all the power source voltages of the apparatus is made the same.

DESCRIPTION OF THE PREFERRED EMBODIMENT

Figure 1:
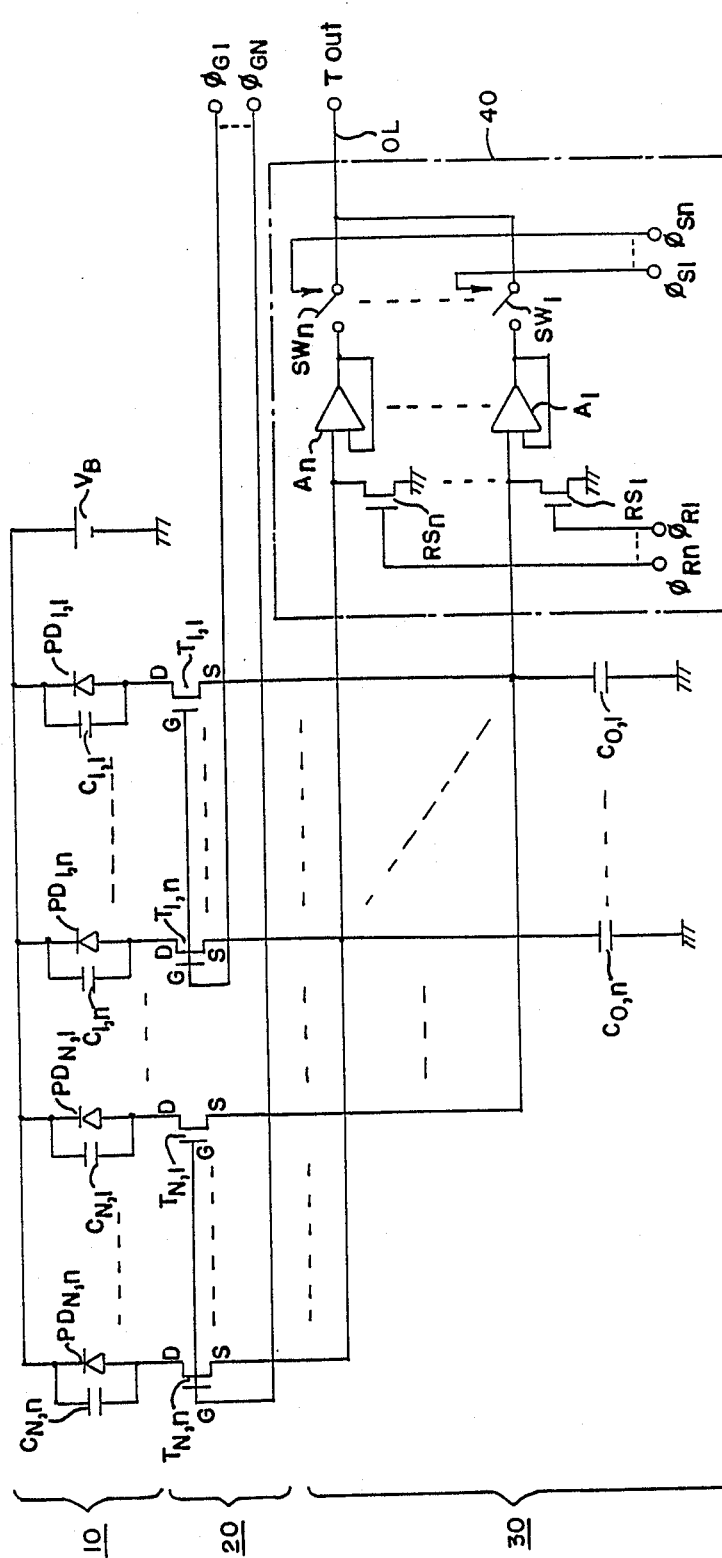
FIG. 1 is a circuit diagram showing an equivalent circuit of an embodiment of a manuscript reading device according to this invention.

Referring to FIG. 1, the device of this embodiment comprises a bias power supply source $V_B$ for outputting a positive bias voltage, a plurality of photodiodes $PD_{1,1}$ through $PD_{N,n}$ divided into N (N: natural number) blocks, each block having n photodiodes, (for example, when reading with 200 SPI resolution a picture image on a manuscript sheet of 4th of B series (B4) in Japanese Industrial Standard (the width of the sheet is 256 mm), 2048 photodiodes are arranged in the transversal direction of the sheet); parasitic capacitances $C_{1,1}$ through $C_{N,n}$ which are equivalently created corresponding to the photodiodes $PD_{1,1}$ through $PD_{N,n}$ as shown in FIG. 1; n-type thin film transistors $T_{1,1}$ through $T_{N,n}$ connected in series to the photodiodes and the parasitic capacitances for transferring electric charges stored in parasitic capacitances to wiring capacitances $C_{\phi,1}$ through $C_{\phi,n}$ created in wiring group (the wiring group consisting on n wires, each connecting source electrodes of the transistors in the corresponding position for each block) by electrically connecting drain electrode D and source electrode S when a corresponding signal out of switching gate signals $O_{G1}$ through $O_{GN}$ (assumed it a positive voltage) is applied to the gate electrode G which is connected in series to the photodiodes and the parasitic capacitances, the gate electrodes for each block being commonly connected; and an analog multiplexer 40 having amplifiers A1 through An corresponding to the wiring capacitances $C_{\phi,1}$ through $C_{\phi,n}$, reading switching elements SW1 through SWn and reset switching elements RS1 through RSn (these switching elements are made of MOSFET), whereby electric charges stored in the wiring capacitances $C_{\phi,1}$ through $C_{\phi,n}$ are sequentially read out in response to reading switching signals $O_{S1}$ through $O_{Sn}$, the wiring already read out being sequentially grounded in response to reset switching signals $O_{R1}$ through $O_{Rn}$.

Figure 2:
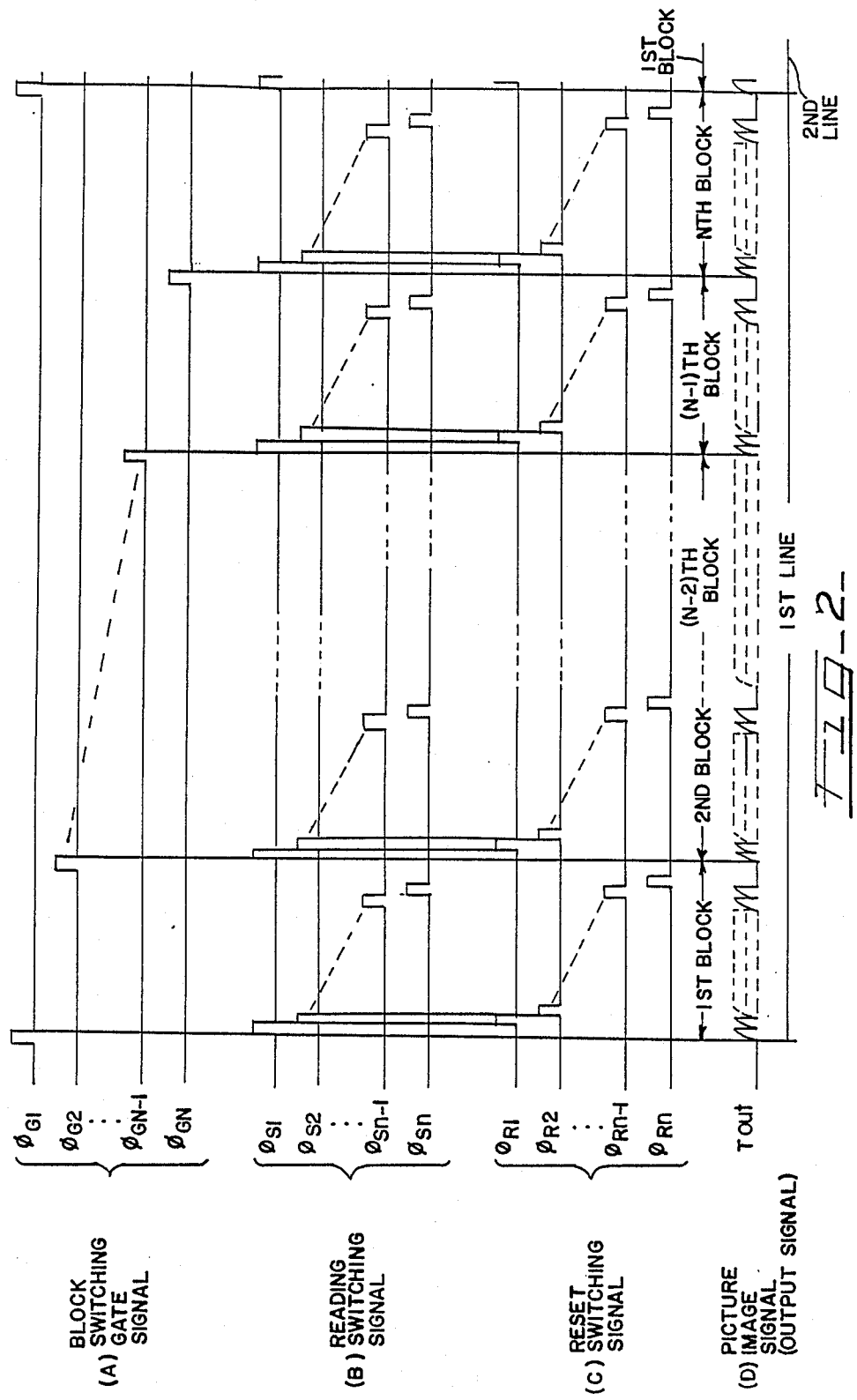
FIG. 2 is a timing chart showing an example of the operation of the device shown in FIG. 1.

FIG. 2 shows the generating modes of the block switching gate signals $O_{G1}$ through $O_{GN}$, the reading switching signals $O_{S1}$ through $O_{Sn}$ and the reset switching signals $O_{R1}$ through $O_{Rn}X$. The operations of the device of this embodiment will be described in reference to FIG. 2.

When picture image information corresponding to one line of a manuscript (not shown) is taken into the photodiodes which are biased to a predetermined positive voltage level by the bias power source $V_B$, as lightness-and-darkness information corresponding to the amount of light incident to every bit, i.e., to every minute area of the picture image corresponding to each photodiodes, positive and negative electric charges stored in the parasitic capacitances corresponding to the photodiodes which received light (lightness information) are reduced by an amount corresponding to the bias voltage as a result of the shifting of electrons. Thus, electric potential at the drain electrodes of the thin film transistors, corresponding to the transistors which received light is raised.

For convenience of description, the following description will be made on an assumption that all the picture image information is on white and therefore all the electric charges prestored in the parasitic capacitances $C_{1,1}$ through $C_{N,n}$ decreases, and accordingly, in all the thin film transistors T1,1 through TN,n, the voltages are higher on their drain electrodes sides.

When the reading of the manuscript is started, a timing generating circuit (not shown) applies the block switching gate signal $O_{G1}$ to the commonly connected gate electrode of the thin film transistors in the first block at a timing after an elapse of time sufficient for the electric charges stored in the parasitic capacitances $C_{1,1}$ through $C_{N,n}$ to decrease to a certain degree as a result of the shifting of the electrons. Thus, thin film transistors T1,1 through T1,n are turned on concurrently and serve to supply electrons by the amount corresponding to the shift. Accordingly, the voltage of the thin film transistors $T_{1,1}$ through T1,n is raised. Consequently, electric charges in the electric capacitances $C_{1,1}$ through C1,n constituting the first block are transferred to and thereafter stored in the wiring capacitances $C_{\phi,1}$ through $C_{\phi,n}$.

Then the timing generating circuit sequentially applies the reading switching signals $SW_1$ through $SW_n$ to the reading switching elements $RS_1$ through $RS_n$ of an analog multiplexer 40 at a timing as shown in FIG. 2(b) and thereafter, as shown in FIG. 2(c), applies the reset switching signals $O_{R1}$ through $O_{Rn}$ to the reset switching elements $RS_1$ through $RS_n$ of the analog multiplexer 40 with a certain time lag as shown in FIG. 2(c).

Accordingly, the electric charges stored in the wiring capacitances $C_{1,1}$ through $C_{N,n}$ that is, source electrode voltage of the thin film transistors $T_{1,1}$ through $T_{N,n}$ are amplified one by one by a corresponding amplifier in the analog multiplexer 40 and outputted as picture image signals of a manuscript picture image via a single output line OL. The signal lines corresponding to the source electrode at which the outputting of picture image signals is terminated are sequentially grounded.

When the outputting of signal electric charges of the first block is completed, the timing generating circuit further applies a block switching gate signal $O_{G1}$ (see FIG. 2(a)) to the commonly connected gate electrodes of the thin film transistors (T2,1 through T2,n) constituting the second block, and thereafter applies the reading switching signals $O_{S1}$ through $O_{Sn}$ (see FIG. 2(b)) and the reset switching signals $O_{R1}$ through $O_{Rn}$ (see FIG. 2(c)) to the reading out switching elements SW1 through SWn and the reset switching elements $RS_1$ through $RS_n$, thereby enabling the analog multiplexer 40 to execute the outputting of picture image signals and the resetting operations. Incidentally, the reset timing is not needed to be determined such a sequential manner as described above. Alternatively, it may be reset concurrently after the picture image signals of every blocks are outputted.

The above described operations are repeated until the outputting of the signal electric charges of nth block is completed. Through this operation, picture image signals (output signal) Tout shown in FIG. 2(d) can be sequentially obtained in synchronism with the application timing of switching signals. When the reading of one line of a manuscript is completed, the manuscript shifts to the next line with respect to the photodiodes PD1,1 through PDN,n, and the picture image information on the next line is stored again in parasitic capacitances C1,1 through CN,n as information as to whether or not the prestored electrons are reduced.

A manuscript reading apparatus of the contact type produces and outputs picture image signals corresponding to a picture image on a manuscript such that a processing of electric charge is repeated for each line of the manuscript in such a manner as described above. It should be noted that, as known from this embodiment, due to the fact that n-type transistors are used for the thin film transistors T1,1 through TN,n and the photodiodes PD1,1 through PDN,n are biased by a positive voltage, electric charge transferring speed (more correctly, the rising speed of thin film transistor source electrode voltage) can be greatly enhanced.

This is made possible by the configuration in which each drain electrode D of the thin film transistors T1,1 through TN,n is connected to each parasitic capacitance C1,1 through CN,n having a smaller capacity, and each source electrode S is connected to each wiring capacitance CO,1 through CO,n having a larger capacity. This configuration is achieved by setting type the thin film transistors T1,1 through TN,n and the bias of the photodiodes PD1,1 through PDN,n as described above.

With this configuration, the variation in voltage between the gate electrode G and the source electrode S can be restricted, and the rapid and efficient transfer of the electric charge (the stable rising of the voltage of the source electrode) can be achieved.

Incidentally, according to an experiment conducted by the inventors on the electric charge transfer speed with respect to the device of this embodiment and a conventional device in which photodiodes P1,1 through PN,n are biased by a negative voltage, the former performs 5 through 10 times faster transfer than the latter. This means that the device of this embodiment can provide the reading switching signals $O_{S1}$ through $O_{Sn}$ and the reset switching signals $O_{R1}$ through $O_{Rn}$ at 5 to 10 times faster timings than the conventional device, and therefore that the device of this embodiment read the same manuscript 5 through 10 times faster than the conventional device.

It is easy to make the application timings of the reading switching signals $O_{S1}$ through $O_{Sn}$ and reset switching signals $O_{R1}$ through $O_{Rn}$ faster because these application timings were originally restricted in accordance with the electric charge transfer speed of the thin film transistors.

In the foregoing embodiment, the picture image signal cannot be read during a period when the thin film transistors of each block are turned on. However, for example, where the transferred electric charges can be stored respectively by dividing the analog multiplexer 40, into two systems, the picture image signals can be continuously read out.

Finally, an example of the structure and the manufacturing method of the device in this embodiment will be described with reference to FIGS. 3 through 7.

Figure 3:
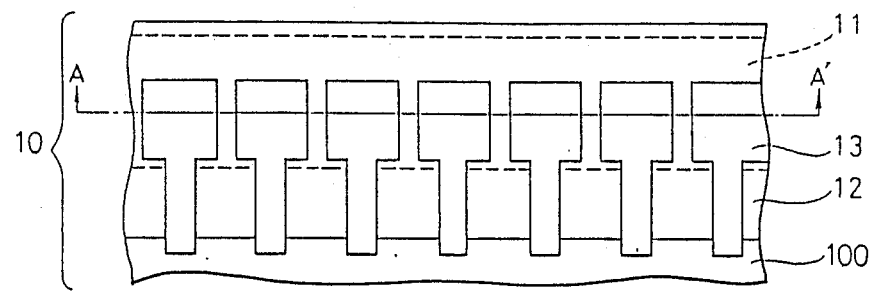
FIG. 3 is a plan view showing a configuration of a photoelectric conversion of the device shown in FIG. 1.
Figure 4:
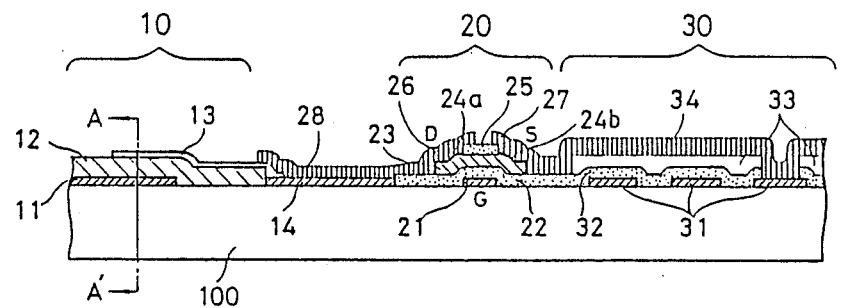
FIG. 4 is a sectional view showing the structure of the device.

Referring to FIGS. 3 and 4, in this embodiment, a sandwich-type photosensor, in which hydrogenated amorphous silicon (a-Si:H) is used for a photoconductive member 12 carrying electrodes on the upper and the lower surfaces thereof, is adopted as a photoconductive converting portion 10 whose function is equivalent to the photodiodes PD1,1 through PDN,n (hereinafter they will be referred to PD as a general term) and the parasitic capacitances C1,1 through CN,n (hereinafter they will be referred to C as a general term).

For the purpose of biasing the photosensor by a positive voltage as described above, a metal electrode 11 is laminated under the lower surface of the photoconductive layer 12 to use as a common electrode (a bias voltage application electrode) and transparent electrodes 13 are laminated on the upper surface thereof to use as separate electrodes. As an electric charge transmitting portion 20 comprising n-type thin film transistors T1,1 through TN,n (hereinafter they will be referred to T as a general term), an inverse stagger structure is adopted wherein a-Si:H is used for the semiconductive layer 23 and n a-Si:H for the ohmic contact layers 24a, 24b, and the semiconductive layer 23 and the ohmic contact layers 24a and 24b are put between a gate electrode 21 and the drain and the source electrodes 26 and 27 as shown in FIG. 4. In FIG. 4, numeral 30 designates a matrix wiring portion constituting the wiring group in which an organic layer such as polyimide is used as an interwiring insulating layer for preventing shorts caused by a pin hole and so on. Incidently, the portions in FIG. 1 corresponding to the photoconductive converting portion 10, the electric charge transmitting portion 20 and the matrix wiring portion 30, each shown in FIG. 4, are designated by the same numerals as those in FIG. 4, respectively.

An example of manufacturing method of the device of this embodiment will be described hereinafter with reference to FIG. 4.

Substrate 100 is made of glass, and on the surface of the substrate 100, as a common lower electrode 11 of the photodiode PD, a connecting wiring 14 for connecting the photodiode PD with the thin film transistor T, the gate electrode (G) 21 of the thin film transistor T, and a lower wiring 31 of the matrix wiring portion 30, chrome (Cr) is vapored (the thickness is about 1000 Å) and patterned into predetermined shapes. Incidentally, such a metal as nickel chrome (NiCr), tungsten (W), tantalum (Ta), etc. can be used as a substitute for chrome.

A nitride silicon layer is laminated as an insulating layer 22 for the gate electrode 21 of the transistor T and an insulating layer 32 for the lower wiring 31 of the matrix wiring portion 30. Furthermore, for the purpose of preventing short circuits caused by pin holes, etc. on the insulating layer 32, an organic insulating layer 33 made of such metal as polyimide is laminated on the surface of the insulating layer 32 is formed, and contact hole are provided at needed portions of the insulating layers 32 and 33 for the connection between the lower wiring 31 and the organic insulating layer 33. Where only the insulating layer 32 can serve as a sufficient insulating layer, the lamination of the organic insulating layer 33 can be omitted.

a-Si:H and n+ a-si:H are vapored on the surface of the insulating layer 22 as a semiconductive layer 23 and an ohmic contact layer 24, respectively by plasma CVD method, and thereafter the portion of the ohmic contact layer 24 facing to the gate electrode 21 is eliminated by etching, thereby dividing the ohmic contact layer into a layer 24a and a layer 24b.

An insulating layer 25 made of silicon nitride is provided to the spacing portion between the ohmic contact layers 24a and 24b thus formed.

a-Si:H is deposited as the photoconductive layer 12 for the photodiode PD (the thickness is about 1 μm) such that the photoconductive layer 12 covers the common lower electrode 11 by plasma CVD method in which SiH4 gas is used; the amount of flow is 20 through 50 SccM; the pressure is 0.2 through 0.5 Torr; the substrate temperature is 15 through 250° C.; RF power is 20 through 50 mW/cm and the vapor deposition time is 30 through 60 minutes.

Indium-tin-oxide (ITO) is deposited on the surface of the photoconductive layer 12 by DC magnetron spattering (the thickness is about 800 Å) as an upper transparent electrode 13; which is thereafter by etching using photolithography divided into separate electrodes.

Figure 5:
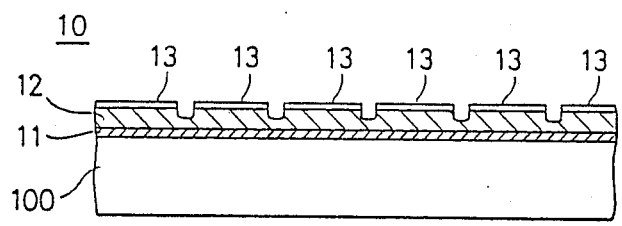
FIG. 5 and 6 are sectional views showing another configuration of the device shown in FIGS. 3 or 4 taken in A-A' line.
Figure 6:
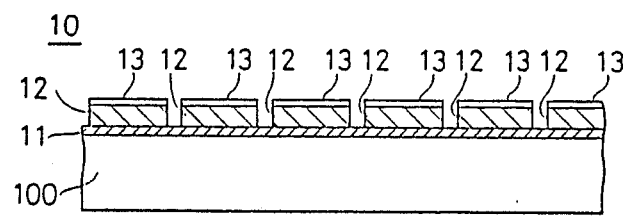

When etching the ITO layer, the a-Si:H layer may also be etched by plasma etching using $CF_4+O_2$ gas and by using resist layer (not shown) on the ITO layer as a mask to eliminate portion beneath spacings between the separate electrodes partially as shown in FIG. 5 or totally as shown in FIG. 6. FIGS. 5 and 6 are sectional views showing the portion taken by A-A' line. Thereafter by executing anneal in an atmosphere of 200° C. for 30 minutes, a photodiode having low dark current, an excellent evenness in the bright and dark currents and an excellent adaptability to its environment can be obtained.

Figure 7:
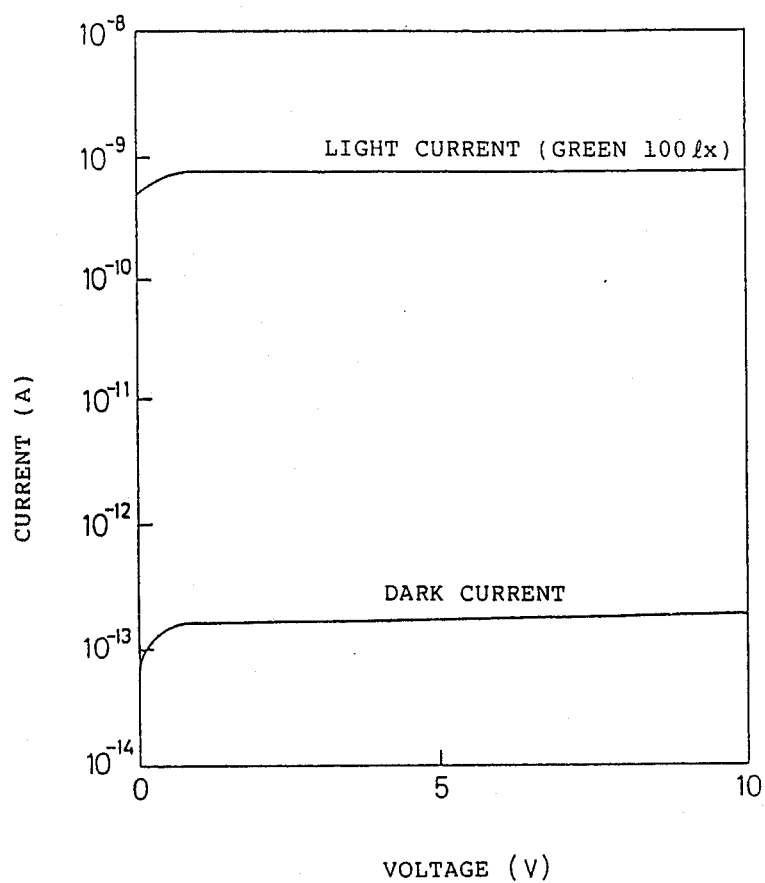
FIG. 7 is a graph showing an I-V characteristic of the photoelectric conversion portion configured as shown in FIG. 5 or 6.

FIG. 7 shows the I-V (current to voltage) characteristic of photoconductive converting portion 10 thus formed in which the bright and the dark currents per the sensor area of 100 μm by 100 μm is shown. The bright current is in a saturated state in which the quantum efficiency is substantially 1, while the dark current is about $10^{-13}$(A) brightness-and-darkness ratio being about 10 and showing an excellent photoconductive conversion characteristic. As the transparent electrode 13, tin oxide can be used as a substitute for indium-tin-oxide.

Aluminum (Al) is deposited by evaporation and patterned into a predetermined shapes to form a drain electrode (D) 26 and the source electrode (S) 27 of the thin film transistor T, the connection wiring 28 for connecting the transparent electrode 13 with the drain electrode 26, and the upper wiring 34 of the matrix wiring portion 30.

By way of the above steps, photoconductive converting portion 10, the electric charge transferring portion 20 and the matrix wiring portion 30 of the device of this embodiment are constructed, the sectional view thereof being shown in FIG. 4. The analog multiplexer 40 is manufactured separately in a well-known method and connected to the device by wire bonding, etc.

However, the manufacturing procedure is not limited to the foregoing steps. Alternatively, for example, the thin film transistor T constituting the electric charge transferring portion 20 can be made by consecutively forming silicon nitride, a-Si:H, silicon nitride through manufacturing steps of (2), (3), (4), and thereafter n a-Si:H is deposited and patterned while providing a contact hole for source-drain.

In the foregoing embodiment, a sandwich type photosensor in which a-si:H is interposed between the metal electrode and the transparent electrode is used as a photodiode PD constituting the photoconductive converting portion 10. However, it is not restricted to this structure. An essential point for the structure is that biasing by a positive voltage is executed and that a predetermined amount of electric charges are stored in its parasitic capacitance.

Furthermore, the method of outputting the signal electric charges is optionally determined, and therefore the circuit is not limited to the equivalent circuit shown in FIG. 1.

The device of this embodiment has a remarkable advantage that since electric charges stored in each parasitic capacitance C of a plurality of photodiodes PD are transferred to the wiring capacitances $C_{0,1}$ through $C_{0,n}$. N times, each time bring for n photodiodes in one group, a single multiplexer having n switching elements enables to take out all the signal electric charges so that the production cost and reliability of the device is enhanced.

What is claimed is:

1. A manuscript reading device for reading a manuscript comprising:
   a plurality of photodiodes for storing electric charges in parasitic capacitances thereof corresponding to lightness and darkness information on each minute area of a picture image on the manuscript by way of biasing said photodiodes by a predetermined positive voltage, each of said photodiodes having a sandwich structure in which a photoconductive layer and a plurality of divided transparent electrodes are sequentially deposited on a common metal electrode, each of said transparent electrodes corresponding to minute areas of said manuscript picture image, said common metal electrode being biased by a positive voltage; and
   a plurality of thin film transistors connected in series to associated ones of said divided transparent electrodes for transferring said electric charges stored in said parasitic capacitances to a corresponding wiring capacitance of a rear wiring group in response to the application of a predetermined positive voltage to gate electrodes thereof, each of said thin film transistors comprising an n-type thin film transistor, wherein said electric charges transferred and stored in said wiring capacitances are sequentially outputted as picture information corresponding to said picture image on the manuscript.

2. The manuscript reading device as set forth in claim 1 wherein said common metal electrode is made of a material selected from the group consisting of chrome, nickel chrome, tungsten and tantalum, said photoconductive layer is made of hydrogenated amorphous silicon, and said transparent electrode is made of a material selected from the group consisting of indium-tin-oxide and indium oxide.

3. A manuscript reading device for reading a manuscript comprising:
   a plurality of photodiodes for storing electric charges in parasitic capacitances thereof corresponding to lightness and darkness information on each minute area of a picture image on the manuscript by way of biasing said photodiodes by a predetermined positive voltage, each of said photodiodes having a sandwich structure in which a photoconductive layer and a plurality of divided transparent electrodes are sequentially deposited on a common metal electrode, each of said transparent electrodes corresponding to minute areas of said manuscript picture image, said common metal electrode being biased by a positive voltage, each of said photodiodes having a configuration that part of the transparent electrode side or whole of said photoconductive layer is eliminated at every spacing between said divided transparent electrodes; and a plurality of thin film transistors connected in series to associated ones of said divided transparent electrodes for transferring said electric charges stored in said parasitic capacitances to a corresponding wiring capacitance of a rear wiring group in response to the application of predetermined positive voltage to gate electrodes thereof, each of said thin film transistors comprising an n-type thin film transistor, wherein the electric charges transferred and stored in said wiring capacitance are sequentially outputted as picture information corresponding to said picture image on the manuscript.

4. The manuscript reading device as set forth in claim 3 wherein said common metal electrode is made of a material selected from the group consisting of chrome, nickel chrome, tungsten and tantalum, said photoconductive layer is made of hydrogenated amorphous silicon; and said transparent electrode is made of a material selected from the group consisting of indium tin oxide and indium oxide.

* * * * *